(12) United States Patent
Huang et al.

(10) Patent No.: US 9,357,389 B2
(45) Date of Patent: May 31, 2016

(54) SECURITY IDENTITY DISCOVERY AND COMMUNICATION METHOD

(71) Applicant: Huawei Technologies Co., Ltd., Shenzhen, Guangdong (CN)

(72) Inventors: Kaidi Huang, Shenzhen (CN); Guorui Yang, Shenzhen (CN); Linfeng Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 14/496,902

(22) Filed: Sep. 25, 2014

(65) Prior Publication Data
US 2015/0012749 A1    Jan. 8, 2015

Related U.S. Application Data

(63) Continuation of application No. PCT/CN2013/070962, filed on Jan. 25, 2013.

(30) Foreign Application Priority Data

Apr. 11, 2012   (CN) .......................... 2012 1 0104825

(51) Int. Cl.
*H04L 9/32* (2006.01)
*H04W 12/06* (2009.01)
(Continued)

(52) U.S. Cl.
CPC .................. *H04W 12/06* (2013.01); *H04L 9/14* (2013.01); *H04L 9/32* (2013.01); *H04L 63/0869* (2013.01); *H04L 63/0876* (2013.01); *H04L 61/6022* (2013.01); *H04W 12/02* (2013.01)

(58) Field of Classification Search
CPC ...... G06F 21/30; G06F 21/445; H04L 9/0813
USPC .................... 726/1, 4, 23; 713/168, 155, 169; 380/270

See application file for complete search history.

(56) References Cited

U.S. PATENT DOCUMENTS 7,506,042 B2 * 3/2009 Ayyagari ............. H04L 63/0281
  709/223
7,616,594 B2 * 11/2009 Roberts ................. H04W 48/14
  370/310

(Continued)

FOREIGN PATENT DOCUMENTS

CN   101540671 A   9/2009
CN   101588573 A   11/2009

(Continued)

OTHER PUBLICATIONS

Jyh-Cheng Chen, Wireless LAN security and IEEE 802.11i, Feb. 2005, vol. 2, pp. 27-36.*

(Continued)

*Primary Examiner* — Dede Zecher
*Assistant Examiner* — Viral Lakhia
(74) *Attorney, Agent, or Firm* — Leydig, Voit & Mayer, Ltd.

(57) ABSTRACT

The present invention provides a security identity discovery method, through hiding or omitting MAC addresses of the first station and a second station in a frame for identity discovery between the two stations, adopting identity codes to identify the identities of the two stations and authenticating the identities by using a ciphertext, improves the degree of privacy protection during identity discovery of the stations.

20 Claims, 8 Drawing Sheets

(51) Int. Cl.
*H04L 9/14* (2006.01)
*H04L 29/06* (2006.01)
*H04W 12/02* (2009.01)
*H04L 29/12* (2006.01)

(56) References Cited

U.S. PATENT DOCUMENTS

| | | | | |
|---|---|---|---|---|
| 7,827,597 B2 * | 11/2010 | Boynton | ............ | H04L 12/5895 380/270 |
| 8,122,482 B2 * | 2/2012 | McGrew | ............ | H04L 63/0263 713/153 |
| 8,271,786 B1 * | 9/2012 | Pradhan | ................ | G06F 21/445 713/168 |
| 2003/0235308 A1 * | 12/2003 | Boynton | ............ | H04L 12/5895 380/270 |
| 2005/0246767 A1 * | 11/2005 | Fazal | ................... | H04L 63/065 726/11 |
| 2006/0274643 A1 | 12/2006 | Choyi et al. | | |
| 2008/0263660 A1 * | 10/2008 | Duffau | ............... | H04L 63/1466 726/22 |
| 2009/0260064 A1 * | 10/2009 | McDowell | ............. | G06F 21/10 726/4 |
| 2010/0070771 A1 * | 3/2010 | Chen | ................... | H04L 63/0823 713/176 |
| 2010/0071062 A1 * | 3/2010 | Choyi | ................ | H04L 63/1441 726/23 |
| 2011/0099623 A1 * | 4/2011 | Garrard | ................ | H04L 63/126 726/14 |
| 2012/0017080 A1 * | 1/2012 | Liu | ....................... | H04L 9/0838 713/155 |
| 2012/0173875 A1 * | 7/2012 | Mahidhara | ............ | H04W 4/008 713/168 |
| 2012/0257536 A1 * | 10/2012 | Kholaif | ................ | H04W 48/20 370/254 |
| 2013/0191901 A1 * | 7/2013 | Black | ................... | H04L 63/0876 726/7 |
| 2013/0198518 A1 * | 8/2013 | Ran | ....................... | H04L 9/0861 713/170 |

FOREIGN PATENT DOCUMENTS

| | | |
|---|---|---|
| CN | 101820629 A | 9/2010 |
| EP | 2372971 A1 | 10/2011 |
| KR | 20030018219 A | 3/2003 |
| WO | WO 2010062056 A2 | 6/2010 |

OTHER PUBLICATIONS

Menezes et al, "Identification and Entity Authentication," Handbook of Applied Cryptography, Chapter 10, pp. 385-424, CRC Press, Inc., Boca Raton, Florida (1997).

* cited by examiner

SECURITY IDENTITY DISCOVERY AND COMMUNICATION METHOD

CROSS-REFERENCE TO RELATED APPLICATIONS

This application is a continuation of International Patent Application No. PCT/CN2013/070962, filed on Jan. 25, 2013, which claims priority to Chinese Patent Application No. 201210104825.9, filed on Apr. 11, 2012, both of which are hereby incorporated by reference in their entireties.

TECHNICAL FIELD

The present invention relates to a technical field of wireless communications, and in particular to a security identity discovery and communication method.

BACKGROUND 802.11 is a standard of wireless local area network formulated by IEEE (Institute of Electrical and Electronics Engineers, Institute of Electrical and Electronics Engineers), which is mainly used for solving wireless access of users and user terminals in a local area network of an office and a campus network.

The IEEE 802.11 technology is configured to formulate a universal MAC (Medium Access Control, medium access control) layer for a plurality of PHYs (Physical Layer, physical layer) to standardize the construction of the wireless local area network. A main task of the medium access control layer MAC is to establish an addressing and channel access control mechanism for multiple stations in a same network, so as to make communications between the multiple stations possible.

A basic component of WLAN (Wireless Local Area Networks, Wireless Local Area Networks) is a BSS (Basic Service Set, basic service set), which consists based on stations STA having certain association within a particular coverage area, such as, a BSS2 and a BSS3 as shown in FIG. 1. In a BSS network, a central station performing a full-time management on a BSS is called as an AP (Access Point, access point), and other stations STA in the network are associated with it. A plurality of BSS networks are mutually connected through a DS to form an ESS (Extended Service Set, extended service set). In the absence of the AP, the stations STA may also directly communicate with each other with a self organized network, and the network is an independent BSS or IBSS, such as BSS1 as shown in FIG. 1.

NAN (Neighborhood Area Network, neighborhood area network) is a project group established by WFA in December, 2011, which commits itself to, under the condition of low energy consumption in a pre-association state, mutual information acquisition between wireless devices in a direct connection manner without the assistance of a relay device (such as AP, base station or the like). It has the following three requirements: 1. a low power consumption (energy saving); 2. direct connection without a relay device; and 3. in a Pre-Association state (only Class 1 information can be sent). The Class 1 information carries a Control Frame (a control frame), Management frames (a management frame) and Data frames (a data frame).

In the NAN technology, the discovery between stations is mainly achieved by broadcasting a beacon frame. Namely, a station, on a certain channel, periodically broadcast sends, in accordance with a certain beacon frame sending period (the value range is 20 ms to 1000 ms and the preset value is 100 ms), a beacon frame carrying its own information using a random event as a starting point. A surrounding station thereof learns about the existence of the station and the information of the station by receiving and interpreting information of the broadcast beacon frame.

An MAC address, also called a hardware address, is configured to define the location of a network device, which consists based on a 48-bit long hexadecimal number, 0-23 digits are an organization unique identifier, which is a mark for identifying a node of a local area network node. 24-47 digits are self-assigned by a manufacturer of the network device. The format of a data packet is as shown in table 1:

TABLE 1

| Octets: 2 | 2 | 6 | 6 | 6 | 2 | 6 | 2 | 4 | 0-7951 | 4 |
|---|---|---|---|---|---|---|---|---|---|---|
| Frame Control | Duration/ID | Address 1 | Address 2 | Address 3 | Sequence Control | Address 4 | Qos Control | HT Control | Frame Body | FCS |

MAC Header

Wherein, a field of Address 1 field is filled with an immediate receiving address of the frame, a field of Address 2 is filled with an immediate sending address of the frame, and a field of Frame Body is loaded with an upper layer content to be transmitted through an MAC packet (such as an IP packet). An MAC addresse is a unique identifier of a station within the scope of communication of an MAC layer. Therefore, when monitoring a beacon frame carrying a certain MAC address in a channel, the surrounding station may determine there exists, in the neighborhood, a station corresponding to the MAC address.

A beacon frame broadcasted by each station may be received by any station around. Since a station could not encrypt a beacon frame broadcasted by itself as no key negotiation is implemented between stations at a Pre-Association (pre-association) state, a beacon frame broadcasted by each station may be interpreted by any station around, and an MAC address information of itself carried in the beacon frame may also be achieved by any station around. The disclosure of the MAC address information will make privacy of a user of each station unprotected.

SUMMARY

The present invention provides a security identity discovery method, in order to improve the degree of privacy protection during identity discovery of stations, including:

a first station sends an identity discovery frame, wherein the identity discovery frame carries an identity code of the first station and target station information, and the target station information includes a first ciphertext;

the first station receives an identity authentication frame sent by a second station, wherein the identity authentication frame carries an identity code of the second station, the identity code of the first station and a second ciphertext;

the first station authenticates the identity of the second station; and the first station sends an identity confirmation frame to the second station, wherein the identity confirmation frame carries the identity code of the second station; or the identity confirmation frame carries the identity code of the first station and the identity code of the second station.

The present invention provides a security identity discovery method, in order to improve the degree of privacy protection during identity discovery of stations, including:

a second station receives an identity discovery frame sent by a first station, wherein the identity discovery frame carries an identity code of the first station and target station information, and the target station information includes a first ciphertext;

the second station authenticates the identity of the first station;

the second station sends an identity authentication frame to the first station, wherein the identity authentication frame carries an identity code of the second station, the identity code of the first station and a second ciphertext; and the second station receives an identity confirmation frame sent by the first station, wherein the identity confirmation frame carries the identity code of the second station; or the identity confirmation frame carries the identity code of the first station and the identity code of the second station.

The present invention further provides a first station for security identity discovery, including:

a first sending module, configured to send an identity discovery frame, wherein the identity discovery frame carries an identity code of the first station and target station information, and the target station information includes a first ciphertext;

a receiving module, configured to receive an identity authentication frame sent by a second station, wherein the identity authentication frame carries an identity code of the second station, the identity code of the first station and a second ciphertext;

an authenticating module, configured to authenticate an identity of the second station; and a second sending module, configured to send an identity confirmation frame to the second station, wherein the identity confirmation frame carries the identity code of the second station; or the identity confirmation frame carries the identity code of the first station and the identity code of the second station.

The present invention further provides a second station for security identity discovery, including:

a first receiving module, configured to receive an identity discovery frame sent by a first station, wherein the identity discovery frame carries an identity code of the first station and target station information, and the target station information includes a first ciphertext;

an authenticating module, configured to authenticates the identity of the first station;

a first sending module, configured to send an identity authentication frame to the first station, wherein the identity authentication frame carries an identity code of the second station, the identity code of the first station and a second ciphertext; and a second receiving module, configured to receive an identity confirmation frame sent by the first station, wherein the identity confirmation frame carries the identity code of the second station; or the identity confirmation frame carries the identity code of the first station and the identity code of the second station.

Through hiding or omitting MAC addresses of both of the first station and the second station in a frame for identity discovery between the two stations, adopting the identity codes to identify the identities of the two stations, and adopting a ciphertext to authenticate the identities, the security identity discovery method provided by the present invention improves the degree of privacy protection during identity discovery of the two stations.

DESCRIPTION OF EMBODIMENTS

Figure 1:
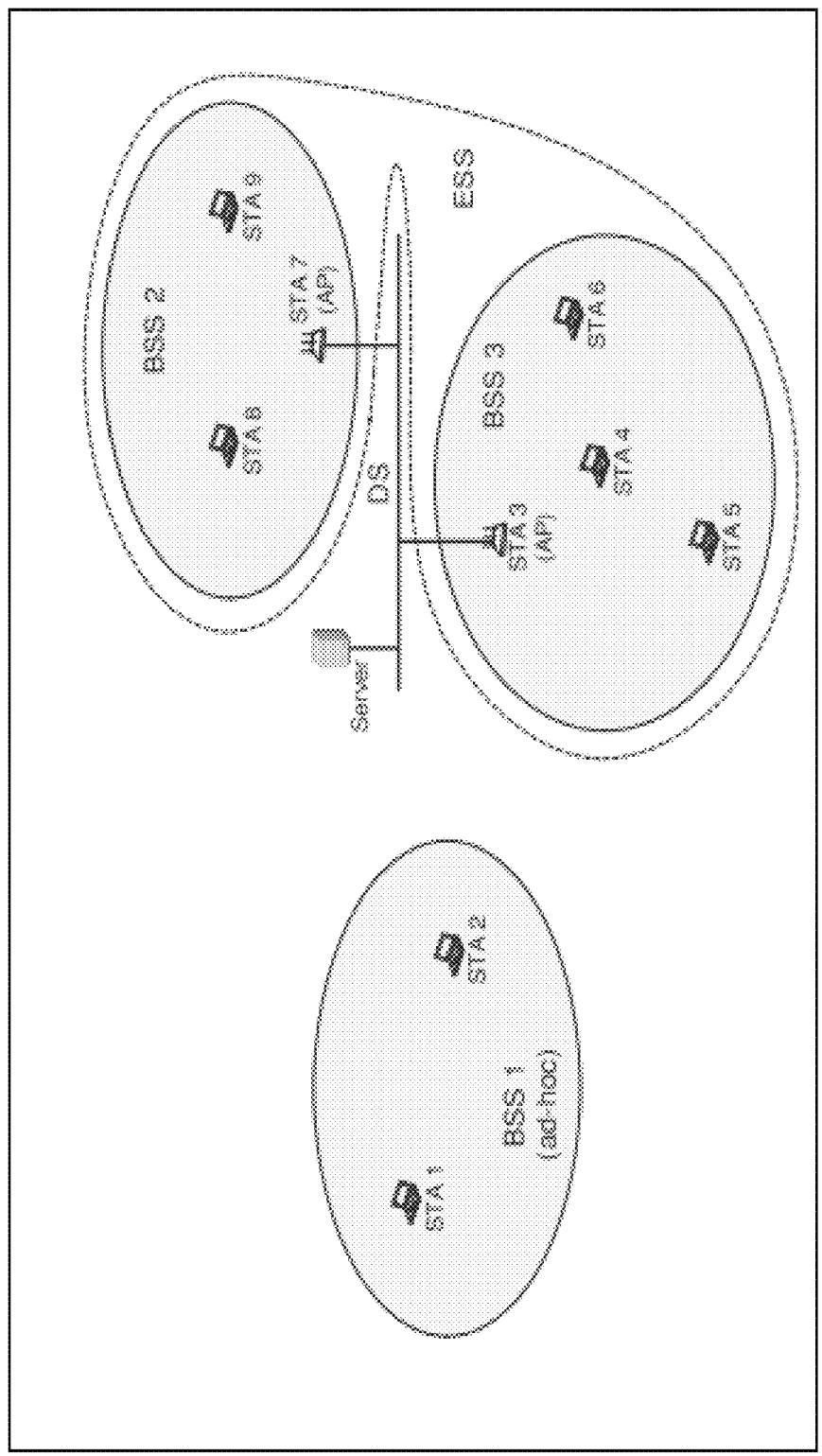
FIG. 1 is a concept graph of an IBSS, a BSS and an ESS of WLAN in the prior art.

In order that those skilled in the art can better understand technical solutions of the present invention, a clear and complete description of the technical solutions in embodiments of the present invention will be given below in combination with the accompanying drawings in the embodiments of the present invention. Apparently, the embodiments described are merely a part, but not all, of the embodiments of the present invention. All other embodiments, obtained by those of ordinary skill in the art based on the embodiments of the present invention without any creative effort, shall fall into the protection scope of the present invention.

In this application, the terms "system" and "network" are often used interchangeably. In this description, the term "and/or" is merely a description of association relation of associated objects, and expresses three possible relations. For example, A and/or B, may represents three cases: A exists alone, A and B exist together, and B exists alone. In addition, in this application, the character "I" generally represents an "or" relation between former-latter associated objects.

It should be understood that, the technical solutions of the embodiments of the present invention may be applied to various communication systems, for example: GSM (Global System of Mobile communication, Global System of Mobile communication) system, CDMA (Code Division Multiple Access, Code Division Multiple Access) system, WCDMA (Wideband Code Division Multiple Access, Wideband Code Division Multiple Access) system, GPRS (General Packet Radio Service, General Packet Radio Service), LTE (Long Term Evolution, Long Term Evolution) system, FDD-LTE (Frequency Division Duplex, Frequency Division Duplex) system, TDD-LTE (Time Division Duplex, Time Division Duplex), UMTS (Universal Mobile Telecommunication System, Universal Mobile Telecommunication System), WiMAX (Worldwide Interoperability for Microwave Access, Worldwide Interoperability for Microwave Access) communication system, microwave communication system and the like.

Embodiment 1

The first embodiment of the present invention provides a security identity discovery method. The method mainly comprises the followings.

A first station sends an identity discovery frame, wherein the identity discovery frame carries an identity code TID of the first station and target station information, and the target station information includes a first ciphertext Challenge Text1.

A second station receives the identity discovery frame and authenticates an identity of the first station.

The second station sends an identity authentication frame to the first station, wherein the identity authentication frame carries an identity code RID of the second station, the identity code TID of the first station and a second ciphertext Challenge Text2.

The first station receives the identity authentication frame and authenticates the identity of the second station.

The first station sends an identity confirmation frame to the second station, wherein the identity confirmation frame carries the RID; or the identity confirmation frame carries the RID and the TID.

Embodiment 2

Figure 2:
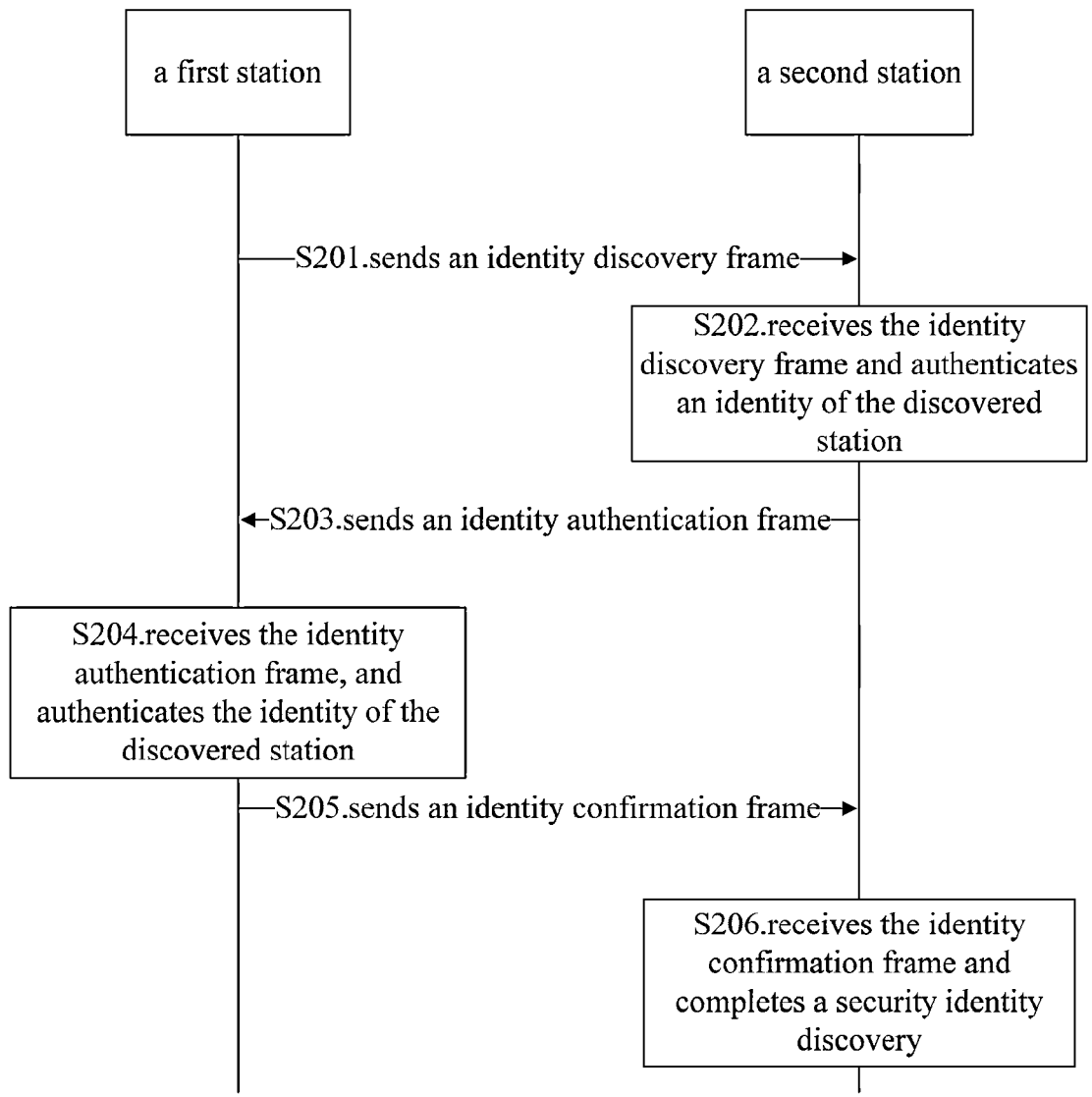
FIG. 2 is a flowchart of a security identity discovery method provided by an embodiment of the present invention.

The second embodiment of the present invention provides a security identity discovery method, and FIG. 2 shows a schematic flowchart of the method. As shown in FIG. 2, the method comprises the followings steps.

S201, a first station sends an identity discovery frame.

The first station sends, in a periodic broadcasting manner, the identity discovery frame to a target station, namely a friend station to be searched by the first station. Meanwhile, a non-target station is also possible to receive the identity discovery frame.

The frame structure of the identity discovery frame is shown in the following table 2.

TABLE 2

| Frame Control | RA | TID Seq. | Target station information | FCS |
|---|---|---|---|---| the target station information includes:

| First ciphertext |
|---|

Wherein, the field of RA is filled with a sending address, TID Seq. is an identity code of the first station which is generated according to a preset algorithm or which is pre-configured, the target station information includes the first ciphertext shared by the first station and the target station to which the identity discovery frame is sent, and the first ciphertext may be pre-configured in the station.

Preferably, the frame structure of the identity discovery frame may be also as shown in the following table 3.

TABLE 3

| Frame Control | RA | TID Seq. | Target station information | FCS |
|---|---|---|---|---|

The target station information includes:

| Partial Mac | First ciphertext |
|---|---|

Wherein, the fields of RA, TID seq. and target station information have the same meanings as those in the table 2. The difference between table 3 and the table 2 lies in that: the target station information further includes a Partial MAC field, and the Partial MAC is partial MAC address information of the target station to which the identity discovery frame is sent. The shown partial MAC address information may be first X digits, last X digits, middle X digits or the like, in the MAC address information of the target station, and the specific selection algorithm may be pre-configured in the station.

Preferably, the identity discovery frame may also be as shown in the following table 4:

TABLE 4

| Frame Control | RA | TID Seq. | PMC | Partial MAC | Target station information | FCS |
|---|---|---|---|---|---|---|

The target station information includes:

| PMC | Partial MAC | First ciphertext |
|---|---|---|

Wherein, the fields of RA, TID seq., first ciphertext and Partial MAC have the same meanings as those in the table 3, and the difference between table 4 and the table 3 lies in that: the target station information further includes a PMC (Partial MAC Choose, Partial MAC address Choose) field, the PMC is a selection strategy indication bit for indicating the selection algorithm of the Partial MAC. For example, when the PMC is 1, it indicates that the selection algorithm of the Partial MAC is to choose the MAC address information of the last X bits of the MAC address of the target station; when the PMC is 2, it indicates that the selection algorithm of the Partial MAC is to choose the MAC address information of last X even bits of the MAC address of the target station, or the like. The PMC may be pre-configured in the station.

Preferably, the first ciphertext is calculated out through a default algorithm 1 according to the MAC address of the first station and the MAC address of the target station of the frame, and the default algorithm 1 may be pre-configured in the station. For example, when the default algorithm 1 is addition, the first ciphertext is obtained by adding the MAC address of the first station and the MAC address of the target station of the frame.

Preferably, the identity discovery frame further carries first information, the first ciphertext is calculated out through the default algorithm 1 according to the MAC address of the first station, the MAC address of the target station of the frame and the first information. The default algorithm 1 may be pre-configured in the station. The first information includes, but not limited to, time information, identity code information, etc.

Preferably, the frame structure of the identity discovery frame may also be as shown in the following table 5.

TABLE 5

| Frame Control | RA | TID Seq. | Target station information | FCS |
|---|---|---|---|---| the target station information includes:

| CAC | First ciphertext |
|---|---|

Wherein, the fields of RA and TID seq. have the same meanings as those in the table 2, and the difference between table 5 and the table 2 lies in that: the first ciphertext is calculated out through an algorithm 1 according to the MAC address of the first station and the MAC address of the target station of the frame. The target station information further includes a CAC (Coding Algorithm Choose, coding algorithm choose) field, and the CAC is a first indication bit, which indicates the algorithm 1 for obtaining the first ciphertext in the table 5.

Preferably, the frame structure of the identity discovery frame may also be as shown in the following table 6.

TABLE 6

| Frame Control | RA | TID Seq. | NoF | Target Station Information 1 | Target Station Information 2 | Target Station Information NoF | FCS |
|---|---|---|---|---|---|---|---| the target station information includes:

| Dialog Token | First ciphertext |
|---|---|

Wherein, the fields of RA and TID seq. have the same meanings as those in the table 2, and the difference between table 6 and the table 2 lies in that: a NoF field is added, the identity discovery frame includes a plurality of target station information. The NoF refers to the number of the target stations to which the identity discovery frame is sent, wherein the target station information further includes a serial number corresponding to each target station. The first ciphertext is a ciphertext shared by the first station and the target station with the corresponding serial number. For example, the target station information 3 includes a serial number 3 and a ciphertext shared by the first station and the target station with the serial number of 3. Thus, the first station may simultaneously perform a security identity confirmation to a plurality of friend stations, and the friend stations are the target stations to which the identity discovery frame is sent. Meanwhile, a non-target station is also possible to receive the identity discovery frame.

Preferably, when the frame structure of the identity discovery frame is as shown in the table 6, the target station information may further include a partial MAC address information Partial MAC of each target station;

or, the target station information may further include the Partial MAC and selection strategy indication bit PMC of each target station;

or, the first ciphertext in the target station information may be calculated out through the default algorithm 1 according to the MAC address of the first station and the MAC address of the target station with the corresponding serial number;

or, the first ciphertext in the target station information may be calculated out through the algorithm 1 according to the MAC address of the first station and the MAC address of the target station with the corresponding serial number, and the target station information further includes the first indicating bit CAC.

S202: the second station receives the identity discovery frame and authenticates an identity of the first station.

Since the second station is not necessarily a friend station of the first station, the second station, after receiving the identity discovery frame, needs to determine whether the second station itself is the target station of the identity discovery frame sent by the first station. Specifically, the first ciphertext carried in the identity authentication frame is analyzed and whether the first ciphertext is the same as the shared ciphertext is authenticated wherein the shared ciphertext is a ciphertext shared by the second station and a friend station of itself, and the shared ciphertext may be pre-configured in the station. If the first ciphertext is the same as the shared ciphertext, step 203a is executed; if not, the second station discards the identity discovery frame and does not execute the following steps.

Preferably, when the first ciphertext is calculated out through the default algorithm 1 according to the MAC address of the first station and the MAC address of the target station of the frame. After receiving the identity discovery frame, the second station calculates out a third MAC address through a default algorithm 2 according to its own MAC address and the first ciphertext.

The default algorithm 2 may be pre-configured in the station. The third MAC address may be the MAC address of the first station, or the MAC address of other station except the first station. The default algorithm 2 may be an inverse algorithm of the default algorithm 1. For example, when the default algorithm 1 is addition, the first ciphertext is obtained by adding the MAC address of the first station and the MAC address of the target station of the frame. The default algorithm 2 is subtraction, and the second station may obtain the third MAC address by subtracting its own MAC address from the first ciphertext.

Then the second station finds out whether there is the third MAC address in its own friend station(s). If a matched station exists in the friend station(s), S203b is executed to further confirm the security identity. If no matched station exists in the friend station(s), the second station discards the identity discovery frame and does not execute the following steps.

Since the identity discovery frame sent by the first station may be received by a non-target station, further security identity confirmation is necessary. Each receiving station may calculate out a third MAC address according to its own MAC address and the received first ciphertext. For example, the default algorithm 1 is subtraction, the default algorithm 2 is addition, the first station with the MAC address of 5 needs to find out the second station with the MAC address of 3, and the sent first ciphertext is 2 (5−2). After receiving the identity discovery frame, the station with the MAC address of 4, by means of the default algorithm 2, considers that the MAC address of the sending station of the frame is 6 (4+2), and a third station with the MAC address of 6 exists in its own friend station(s). At this time, wrong security identity confirmation occurs, so that a further security identity confirmation needs to be performed.

Preferably, when the identity discovery frame further carries first information, and the first ciphertext is calculated out through the default algorithm 1 according to the MAC address of the first station, the MAC address of the target station of the frame and the first information. After receiving the identity discovery frame, the second station calculates out the third MAC address through the default algorithm 2 according to its own MAC address, the first ciphertext and the first information.

Then the second station finds out whether the third MAC address exists in its own friend station(s). The friend station(s) herein and hereinafter refer to a list pre-configured in the station and recording the friend station(s) and the MAC addresse(s) corresponding to the friend station(s). If a matched station exists in the friend station(s), S203$b$ is executed to further confirm the security identity; if no matched station exists in the friend station(s), the second station discards the identity discovery frame and does not execute the following steps.

Preferably, when the frame structure of the identity discovery frame is as shown in the table 6, the first ciphertext is calculated out through the default algorithm 1 according to the MAC address of the first station and the MAC address of the target station with the corresponding serial number. After receiving the identity discovery frame, the second station firstly calculates out the third MAC address through the default algorithm 2. And then, the second station finds out whether the third MAC address exists in its own friend station(s): if a matched station exists in the friend stations, S203$b$ is executed to further confirm the security identity; if no matched station exists in the friend stations, the second station discards the identity discovery frame, and does not execute the following steps.

Preferably, when the frame structure of the identity discovery frame is as shown in the table 5, after receiving the identity discovery frame, the second station firstly confirms an algorithm 2 according to the first indication bit. When the second station is the target station to which the identity discovery frame is sent, the second station may obtain the third MAC address through the algorithm 2. For example, the algorithm 2 may be an inverse operation of the algorithm 1, the second station calculates out the third MAC address through the algorithm 2. Then, the second station finds out whether the third MAC address exists in its own friend stations: if a matched station exists in the friend stations, S203$c$ is executed; if no matched station exists in the friend stations of the second station, the second station discards the identity discovery frame, and does not execute the following steps.

The reason why further security identity confirmation needs to be performed is similar to that in the above-mentioned preferred embodiment, which will not be repeated redundantly herein.

Preferably, when the format of the identity discovery frame is as shown in the table 6, the first ciphertext is calculated out through an algorithm 1 according to the MAC address of the first station and the MAC address of the target station with the corresponding serial number. When the target station information in the table 7 further carries the first indication bit, the second station, after receiving the identity discovery frame, firstly determines the algorithm 2 according to the first indication bit, and calculates out the third MAC address through the algorithm 2. Then the second station finds out whether the third MAC address exists in its own friend station(s): if a matched station exists in the friend stations, S203$b$ is executed to further confirm the security identity; if no matched station exists in the friend stations, the second station discards the identity discovery frame, and does not execute the following steps.

Preferably, when the frame structure of the identity discovery frame is as shown in the table 6, the second station, after receiving the identity discovery frame, sequentially analyzes the first ciphertext carries in each target station information. If there exists a first ciphertext which is the same as the shared ciphertext of the second station and its friend station, S203$d$ is executed; if not, the identity discovery frame is discarded, and the following steps are not executed.

Preferably, when the frame structure of the identity discovery frame is as shown in the table 3, in the S202 and its preferred embodiment, the second station, after receiving the identity discovery frame and before authenticating the identity of the first station, firstly authenticates whether the partial MAC address information Partial MAC of the target station to which the identity discovery frame is sent matches its own MAC address. For example, if the Partial MAC selects the last X bits of the MAC address of the target station, the second station compares whether the last X bits of its own address matches the Partial MAC. If the Partial MAC matches its own MAC address, the second station continues to authenticate the identity of the first station; if the Partial MAC does not matches its own MAC address, the second station discards the identity discovery frame, and does not execute the following steps.

Preferably, when the frame structure of the identity discovery frame is as shown in the table 4, in the S202 and its preferred embodiment, the second station, after receiving the identity discovery frame and before authenticating the identity of the first station, firstly determines the selection algorithm of Partial MAC according to the selection strategy indication bit PMC, and authenticates whether the Partial MAC matches its own MAC address. If the Partial MAC matches its own MAC address, the second station continues to authenticate the identity of the first station. If the Partial MAC does not matches its own MAC address, the second station discards the identity discovery frame, and does not execute the following steps.

S203$a$: the second station sends an identity authentication frame to the first station.

The frame structure of the identity authentication frame is as shown in table 7:

TABLE 7

| Frame Control | RID Seq. | TID Seq. | Second ciphertext | FCS |
|---|---|---|---|---|

Wherein, RID Seq. is the identity code of the second station which is generated according to a preset algorithm or which is pre-configured. the RID Seq. may be generated according to the preset algorithm completely. The RID Seq. may also be a pre-configured and fixed identity code. The RID Seq. may also be selected from the identity code TID Seq. of the first station. The specific selection algorithm may be pre-configured to the station. The TID Seq. is the identity code of the first station, and the second ciphertext may be the same as or different from the ciphertext in the identity discovery frame.

When the frame structure of the identity discovery frame is as shown in the table 6, the identity authentication frame further carries a corresponding serial number. For example, the second station is one of the target stations to which the identity discovery frame is sent, and the serial number in the identity discovery frame is 3. Then, after the second station authenticating the first station as its friend station, the identity authentication frame carries the serial number 3.

S203$b$: the second station sends an identity authentication frame to the first station.

The frame structure of the identity authentication frame is as shown in table 7, wherein the fields of RID Seq. and TID Seq. have the same meanings as those in the table 7, the difference from the table 7 lies in that: the second ciphertext is calculated out by the second station through a default algorithm 3 according to the third MAC address and its own MAC address. The default algorithm 3 may be pre-configured in the station.

When the third MAC address is calculated out by the second station through the default algorithm 2 according to its own MAC address, the first ciphertext and the first information, the second ciphertext is calculated out by the second station through the default algorithm 3 according to its own MAC address, the third MAC address and second information. And the identity authentication frame further carries the second information. The first information includes, but not limited to, time information, identity code information, etc.

When the frame structure of the identity authentication frame is as shown in the table 6, the identity authentication frame further carries a corresponding serial number.

S203c: the second station sends an identity authentication frame to the first station.

The frame structure of the identity authentication frame is as shown in table 8:

TABLE 8

| Frame Control | RID Seq. | TID Seq. | CAC | Second ciphertext | FCS |

Wherein, the fields of RID Seq. and TID Seq. have the same meanings as those in the table 7, the difference between table 8 and the table 7 lies in that: the second ciphertext in the table 8 is calculated out by the second station through an algorithm 3 according to the MAC address of the second station and the third MAC address, a second indication bit CAC is added, and the CAC indicates the algorithm 3.

When the frame structure of the identity authentication frame is as shown in the table 6, the identity authentication frame further carries a corresponding serial number.

S203d: the second station sends an identity authentication frame to the first station.

The frame structure of the identity authentication frame is as shown in table 9:

TABLE 9

| Frame Control | RID Seq. | TID Seq. | Dialog Token | Second ciphertext | FCS |

Wherein, the fields of RID Seq. and TID Seq. have the same meanings as those in the table 7, the difference between table 9 and the table 7 lies in that a corresponding serial number Dialog Token is added in the table 9.

S204: the first station receives the identity authentication frame, and authenticates the identity of the second station.

After receiving the identity authentication frame, the first station analyzes the second ciphertext carried in the identity authentication frame, and authenticates whether the second ciphertext is the same as the shared ciphertext, wherein the shared ciphertext is a ciphertext shared by the first station and the target station to which the identity discovery frame is sent. If so, S205a is executed; if not, S205b is executed.

Preferably, if the frame structure of the identity authentication frame is as shown in the table 7, and the second ciphertext is calculated out through the default algorithm 3 according to the MAC address of the second station and the third MAC address. After receiving the identity authentication frame, the first station firstly calculates out a fourth MAC address through a default algorithm 4 according to its own MAC address and the second ciphertext, then, the first station finds out whether the fourth MAC address exists in the target station to which the identity discovery frame is sent, namely, authenticates whether the fourth MAC address matches the target station to which the identity discovery frame is sent. If the fourth MAC address exists in the target station to which the identity discovery frame is sent, S205a is executed; if not, S205b is executed, or the identity authentication frame is discarded and the following steps are not executed.

The default algorithm 4 may be pre-configured in the station and may be an inverse algorithm of the default algorithm 3. For example, when the default algorithm 3 is multiplication, the second ciphertext is obtained by multiplying the MAC address of the second station by the third MAC address, and the default algorithm 4 is division. The first station may obtain the fourth MAC address by dividing the second ciphertext by its own MAC address.

Preferably, when the second ciphertext is calculated out by the second station through the default algorithm 3 according to its own MAC address, the third MAC address and second information, and the identity authentication frame further carries the second information, after receiving the identity authentication frame, the first station firstly calculates out the fourth MAC address through the default algorithm 4 according to its own MAC address, the second ciphertext and the second information. Then, the first station finds out whether the fourth MAC address exists in the target station to which the identity discovery frame is sent, namely, authenticates whether the fourth MAC address matches the target station to which the identity discovery frame is sent. If the fourth MAC address exists in the target station to which the identity discovery frame is sent, S205a is executed; if not, S205b is executed, or the identity authentication frame is discarded and the following steps are not executed.

When the frame structure of the identity discovery frame is as shown in the table 6, and the identity authentication frame further carries a corresponding serial number, the first station, after calculating out the fourth MAC address, finds out whether the MAC address exists in the target station with the corresponding serial number. For example, the second station is one of the target stations to which the identity discovery frame is sent and the serial number in the identity discovery frame is 3. Then after the second station authenticating the first station as its friend station, the identity authentication frame carries the serial number 3. The first station authenticates whether the MAC address of the target station, to which the identity discovery frame is sent and of which the serial number is 3, matches the calculated MAC address of the second station. If so, S205a is executed; if not, S205b is executed, or the identity authentication frame is discarded and the following steps are not executed.

Preferably, when the frame structure of the identity authentication frame is as shown in the table 8, after receiving the identity authentication frame, the first station firstly selects an algorithm 4 according to a second indication bit CAC and calculates the fourth MAC address. Then, the first station finds out whether the MAC address exists in the target station to which the identity discovery frame is sent, if the MAC address exists in the target station to which the identity discovery frame is sent, S205a is executed; if not, S205b is executed, or the identity authentication frame is discarded and the following steps are not executed.

When the frame structure of the identity discovery frame is as shown in the table 6, and when the identity authentication frame further carries the corresponding serial number, the first station, after calculating out the fourth MAC address, finds out whether the MAC address exists in the target station with the corresponding serial number. For example, the second station is one of the target stations to which the identity discovery frame is sent and of which the serial number in the identity discovery frame is 3. Then, after the second station authenticating the first station as its friend station, the identity authentication frame further carries the serial number 3. Then the first station authenticates whether the MAC address of the target station, to which the identity discovery frame is sent and of which the serial number is 3, matches the calculated MAC address of the second station. If so, S205a is executed; if not, S205b is executed, or the identity authentication frame is discarded and the following steps are not executed.

S205a: the first station sends an identity confirmation frame to the second station, wherein the identity confirmation frame carries the identity code of the second station, or the identity confirmation frame carries the identity code of the first station and the identity code of the second station.

S205b: the first station sends an identity confirmation frame to the second station, wherein the identity confirmation frame carries the identity code of the second station, or the identity confirmation frame carries the identity code of the first station and the identity code of the second station.

preferably, the identity confirmation frame further carries denial information for indicating that the second station does not pass an identity authentication; or the identity confirmation frame carries denial information and a special value, wherein the denial information indicates that the second station does not pass an identity authentication, and the special value indicates that the identity confirmation frame carries the denial information.

S206: the second station receives the identity confirmation frame and completes a security identity confirmation.

Preferably, after receiving the identity confirmation frame carrying the denial information, the second station records the identity code of the first station in a stranger list, and discards a data packet carrying the identity code information for a period of time hereafter. The length of the period of time may be controlled by a counter in the station.

Through performing, before mutual communication of the first station and the second station at a Pre-Association state, a security identity discovery program to enable the two stations to confirm the security identity of each other, and hiding or omitting the MAC addresses of the two stations in message frames in the embodiment, the security identity discovery method provided by the embodiment improves the degree of privacy protection when a user uses wireless communication.

Embodiment 3

Figure 3:
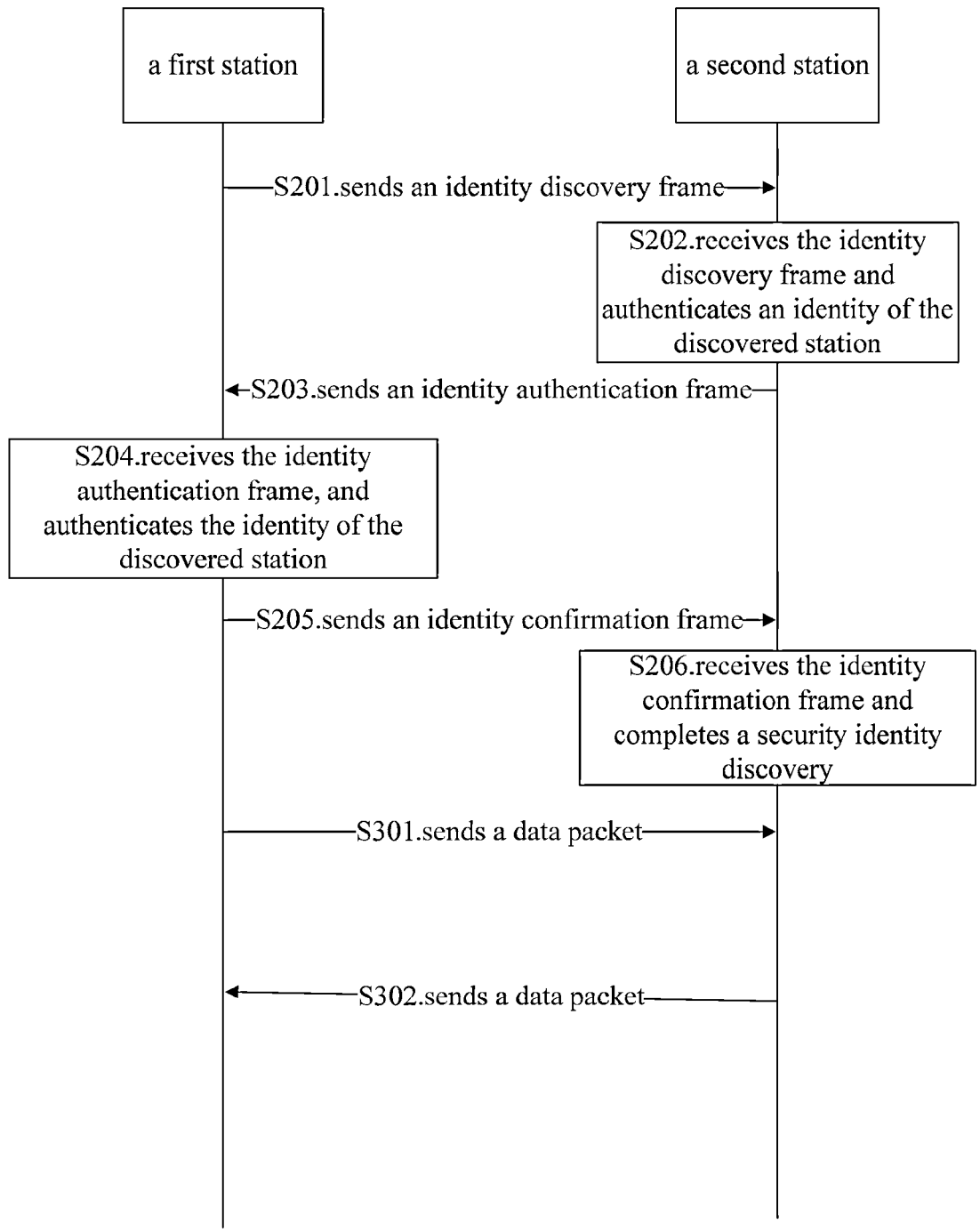
FIG. 3 is a flowchart of a security identity communication method provided by an embodiment of the present invention.

The third embodiment of the present invention provides a security identity communication method, and the method is a subsequent communication method of the security identity discovery method of the second embodiment. FIG. 3 shows a schematic flowchart of the method. As shown in FIG. 3, the method includes following steps.

After the S206, the second station receiving the identity confirmation frame and passing the security identity authentication, in the second embodiment, the following steps is performed.

S301: the first station sends a data packet to the second station.

The data packet sent by the first station performs security identity identification by using the identity codes of the two stations. For example, the identity code of the first station is TID Seq., and the identity code of the second station RID Seq. The first station may fill the field of a sender address with the TID Seq., and fill the field of a receiver address with the RID Seq. in the data packet.

If the digit numbers of the identity codes of the two stations exceeds that of a normal MAC address, shortened identity codes may be extracted from the identity codes of the two stations according to a default mode. For example, last 48 bits are extracted, and a shortened identity code is added in a corresponding address field.

Preferably, the frame structure of the data packet is as shown in table 10:

TABLE 10

| Frame Control | Traffic Number | Payload | FCS |

Wherein, Payload is a packaged transmission content. The Payload may be a specific data content or a packaged frame body. The address bit of the data packet is vacant or omitted.

S302: the second station sends a data packet to the first station.

The data packet sent by the second station also performs a security identity identification by using the identity codes of the two stations. For example, the identity code of the first station is TID Seq. and the identity code of the second station RID Seq. The second station may fill the field of a sender address with the RID Seq., and fill the filed of a receiver address with the TID Seq. in the data packet.

If the digit numbers of the identity codes of the two stations exceeds that of a normal MAC address, shortened identity codes may be extracted from the identity codes of the two stations according to a default mode. For example, last 48 bits are extracted, and the shortened identity code is put in a corresponding address field.

Through Two stations, which confirm security identities mutually, communicating by identifying the security identities of the two stations with identity codes, and hiding or omitting the MAC addresses of both of the two stations in the message frames in the embodiment, the security identity communication method provided by the embodiment, improves the degree of privacy protection when a user uses wireless communication.

Embodiment 4

Figure 4:
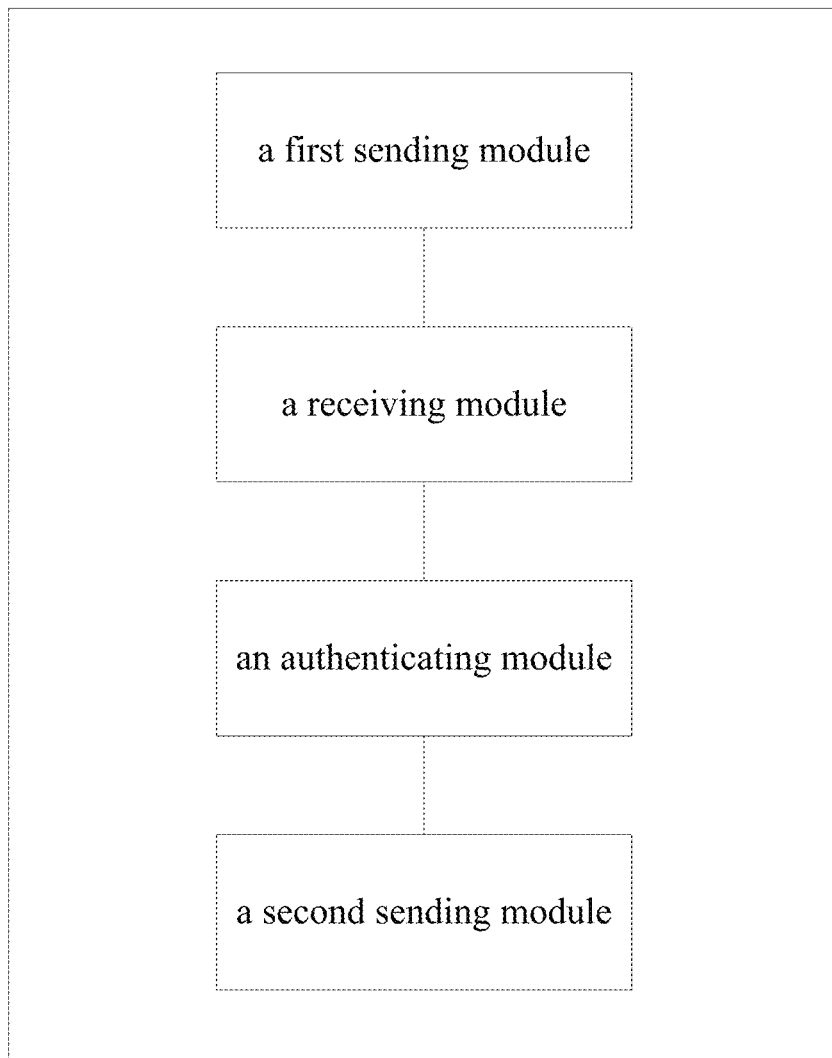
FIG. 4 is a structure diagram of a first station for security identity discovery provided by an embodiment of the present invention.
Figure 5:
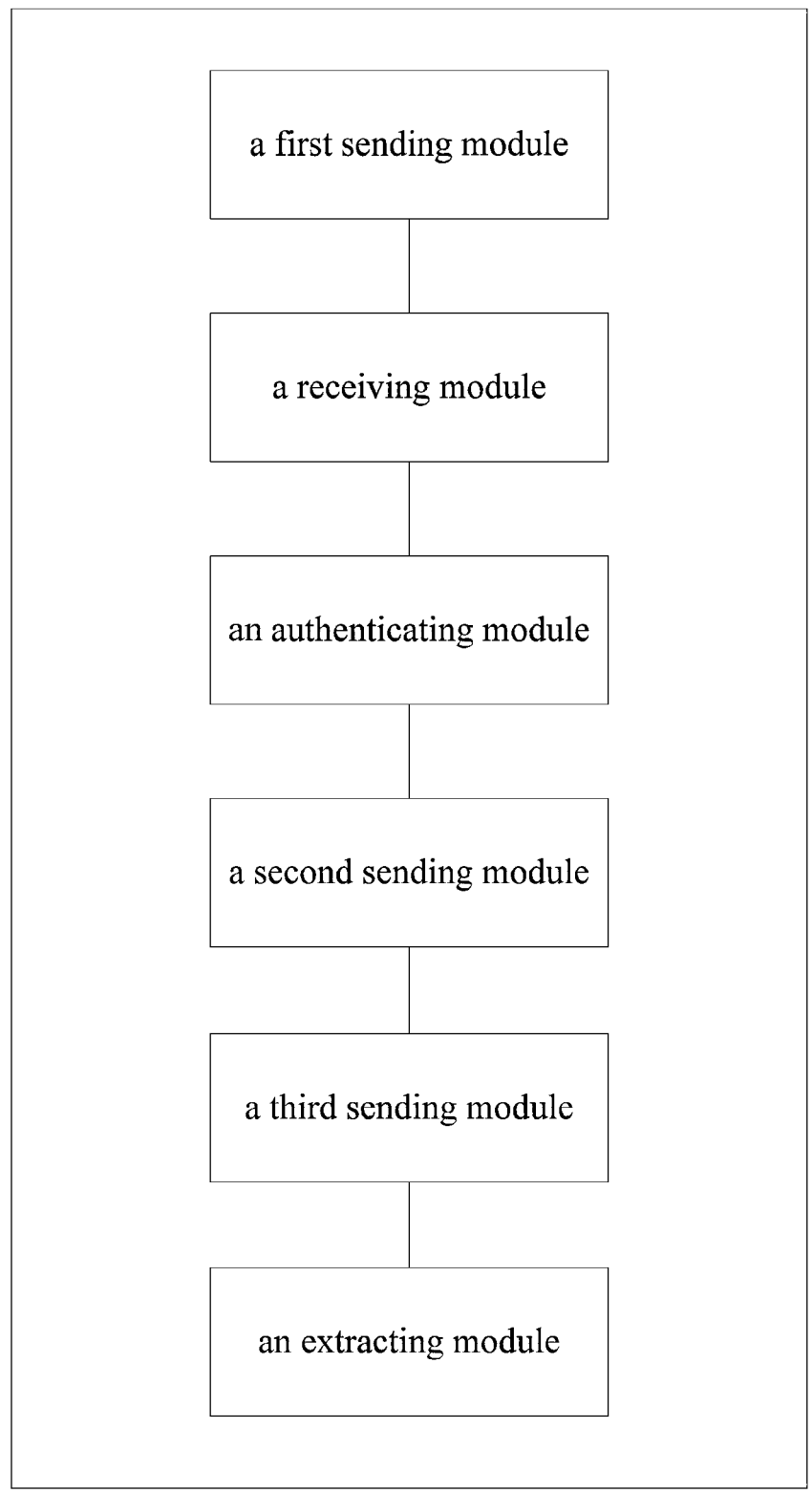
FIG. 5 is a structure diagram of a first station for security identity communication provided by an embodiment of the present invention.

The fourth embodiment of the present invention provides a security identity first station. FIG. 5 shows a schematic structure diagram of the station. As shown in FIG. 4, the station includes:

a first sending module, configured to send an identity discovery frame, wherein the identity discovery frame carries an identity code of the first station and a first ciphertext;

a receiving module, configured to receive an identity authentication frame sent by a second station, wherein the identity authentication frame carries an identity code of the second station, the identity code of the first station and a second ciphertext;

an authenticating module, configured to authenticate an identity of the second station; and a second sending module, configured to send an identity confirmation frame to the second station, wherein the identity confirmation frame carries the identity code of the second station.

Wherein, the first sending module may send the identity discovery frame to a plurality of friend stations in a periodic broadcasting manner, and meanwhile, a non-friend station is also possible to receive the identity discovery frame. The identity code of the first station and the identity code of the second station are identity codes which are generated according to a preset algorithm or which are pre-configured. The first ciphertext is a ciphertext shared by the first station and the second station, and/or the second ciphertext is a ciphertext shared by the first station and the second station.

Wherein, the authenticating module is specifically configured to enable the first station to authenticate whether the first ciphertext is the same as the shared ciphertext, wherein the shared ciphertext is a ciphertext shared by the first station and the target station to which the identity discovery frame is sent.

Wherein, the identity confirmation frame further carries the identity code of the first station.

Wherein, the identity discovery frame further carries the amount of the target station information, the target station information further includes serial numbers of target stations, and the first ciphertext is a ciphertext corresponding to the target station with the corresponding serial number, and the identity authentication frame further carries the corresponding serial number.

Preferably, the first station further includes a calculating module, wherein the calculating module is configured to calculate out the first ciphertext through a default algorithm 1 according to the MAC address of the first station and the MAC address of the target station to which the identity discovery frame is sent, or according to the MAC address of the first station and the target station with the corresponding serial number. When the second ciphertext is calculated out through a default algorithm 3 according to the MAC address of the second station and a third MAC address, the calculating module is further configured to calculate out a fourth MAC address through a default algorithm 4 according to the MAC address of the first station and the second ciphertext. At this time, the authenticating module is specifically configured to authenticate whether the fourth MAC address matches the target station to which the identity discovery frame is sent.

Preferably, the first station further includes an encrypting module, wherein the encrypting module is configured to calculate out the first ciphertext through an algorithm 1 according to the MAC address of the first station and the MAC address of the target station to which the identity discovery frame is sent, or according to the MAC address of the first station and the target station with the corresponding serial number. When the second ciphertext is calculated out through an algorithm 3 according to the MAC address of the second station and the third MAC address, and the identity authentication frame sent back by the second station further carries a second indication bit, the encrypting module is further configured to firstly determine an algorithm 4 according to the second indicating bit, and calculate out the fourth MAC address through the algorithm 4. At this time, the authenticating module is specifically configured to authenticate whether the fourth MAC address matches the target station to which the identity discovery frame is sent.

Embodiment 5

The fifth embodiment of the present invention provides a first station for security identity communication. FIG. 5 shows a schematic structure diagram of the station. As shown in FIG. 5, on the basis of the fourth embodiment and the preferred embodiment thereof, the station further includes:

a third sending module, configured to send a data packet to the second station, wherein the data packet carries sender address information and receiver address information, the sender address information is the identity code of the first station, and the receiver address information is the identity code of the second station.

Preferably, the first station further includes an extracting module, wherein when the digit numbers of the identity code of the first station exceeds that of a normal MAC address, the extracting module is configured to extract a shortened identity code from the identity code of the first station and add the shortened identity code in address information corresponding to the data packet.

Embodiment 6

Figure 6:
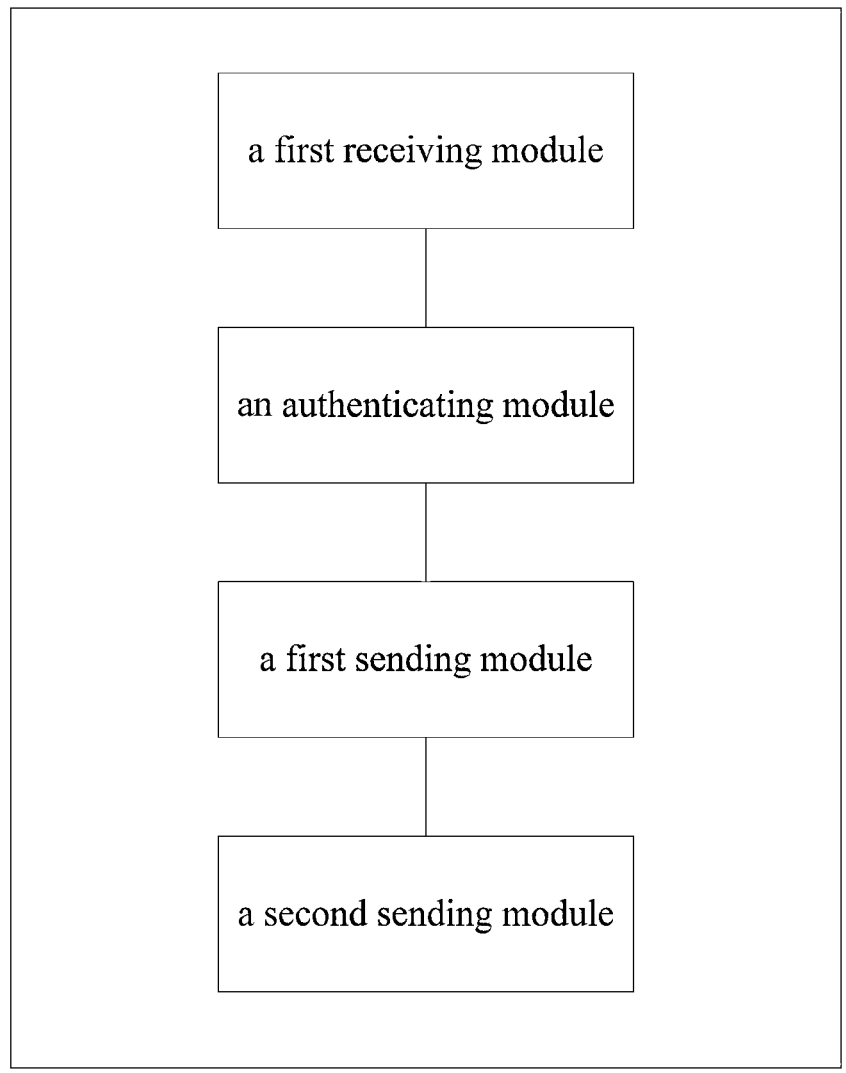
FIG. 6 is a structure diagram of a second station for security identity discovery provided by an embodiment of the present invention.

The sixth embodiment of the present invention provides a security identity second station, and FIG. 6 shows a schematic structure diagram of the station. As shown in FIG. 6, the station includes:

a first receiving module, configured to receive an identity discovery frame sent by a first station, wherein the identity discovery frame carries the identity code of the first station and a first ciphertext;

an authenticating module, configured to authenticate the identity of the first station;

a first sending module, configured to send an identity authentication frame to the first station, wherein the identity authentication frame carries an identity code of the second station, the identity code of the first station and a second ciphertext; and a second receiving module, configured to receive an identity confirmation frame sent by the first station, wherein the identity confirmation frame carries the identity code of the second station.

Wherein, the authenticating module is specifically configured to authenticate whether the first ciphertext is the same as the shared ciphertext, and the shared ciphertext is a ciphertext shared by the second station and its friend station. The identity code of the first station and the identity code of the second station are the identity codes which are generated according to a preset algorithm or which is pre-configured. The first ciphertext is a ciphertext shared by the first station and the second station, and/or the second ciphertext is a ciphertext shared by the first station and the second station.

Wherein, the identity discovery frame further carries the amount of the target station information, the target station information further includes serial numbers of target stations, the first ciphertext is a ciphertext corresponding to the target station with the corresponding serial number; and the identity authentication frame further carries a corresponding serial number.

Preferably, the second station further includes a determining module, wherein when the identity discovery frame further carries a selection strategy indication bit. The determining module is configured to determine the selection algorithm of the partial MAC address information according to the selection strategy indication bit.

Preferably, the second station further includes a calculating module, wherein when the first ciphertext is calculated out through a default algorithm 1 according to the MAC address of the first station and the MAC address of the target station to which the identity discovery frame is sent, or according to the MAC address of the first station and the MAC address of the target station with the corresponding serial number, the calculating module is configured to calculate out a third MAC address through a default algorithm 2; at this time, the authenticating module is specifically configured to authenticate whether the third MAC address is configured in the friend station of the second station. The calculating module is further configured to calculate out a second ciphertext through a default algorithm 3 according to the MAC address of the second station and the third MAC address.

Preferably, the second station further includes an encrypting module, wherein when the first ciphertext is calculated out through an algorithm 1 according to the MAC address of the first station and the MAC address of the target station to which the identity discovery frame is sent, or according to the MAC address of the first station and the MAC address of the target station with the corresponding serial number, and the identity discovery frame further carries a first indicating bit and the first indicating bit indicates the algorithm 1, the encrypting module is configured to firstly determine an algorithm 2 according to the first indication bit and calculate out a third MAC address according to the algorithm 2. At this time, the authenticating module is specifically configured to authenticate whether the third MAC address is configured in the friend station of the second station. The encrypting module is further configured to calculate out a second ciphertext through an algorithm 3 according to the MAC address of the second station and the third MAC address.

Preferably, the second station further includes a recording module, wherein when the identity confirmation frame further carries denial information and the denial information indicates that the second station does not pass an identity authentication, the recording module is configured to record the identity code of the first station in a stranger list, and discard a data packet carrying the identity code of the first station for a period of time hereafter.

Embodiment 7

Figure 7:
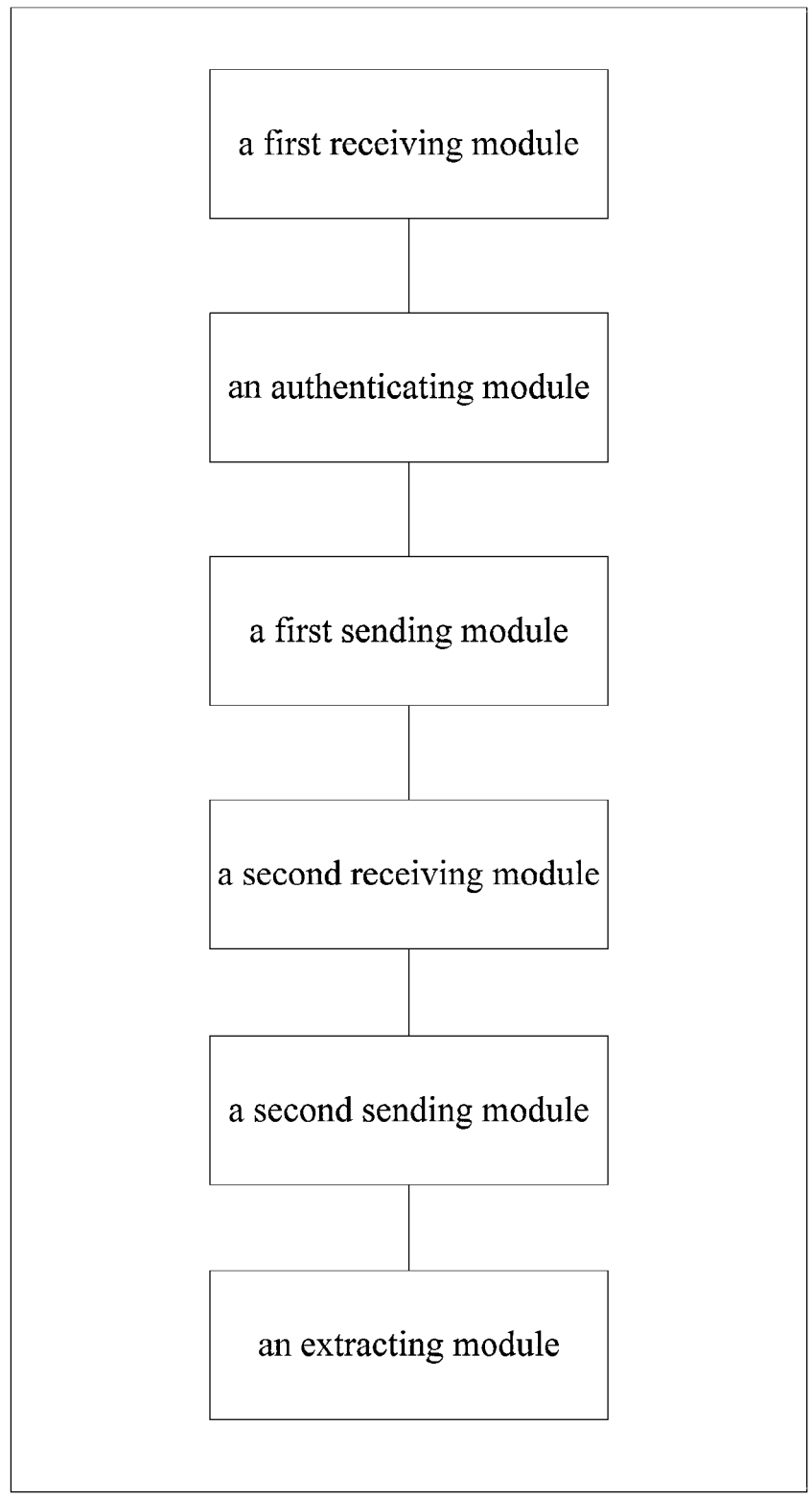
FIG. 7 is a structure diagram of a second station for security identity communication provided by an embodiment of the present invention.

The seventh embodiment of the present invention provides a second station for security identity communication. FIG. 7 shows a schematic structure diagram of the station. As shown in FIG. 7, on the basis of the sixth embodiment and the preferred embodiment thereof, the station further includes:

a second sending module, configured to send a data packet to the first station, wherein the data packet carries sender address information and receiver address information, the sender address information is the identity code of the second station, and the receiver address information is the identity code of the first station.

Preferably, the first station further includes an extracting module, wherein when the digit numbers of the identity code of the second station exceeds that of a normal MAC address, the extracting module is configured to extract a shortened identity code from the identity code of the second station and add the shortened identity code in address information corresponding to the data packet.

Embodiment 8

Figure 8:
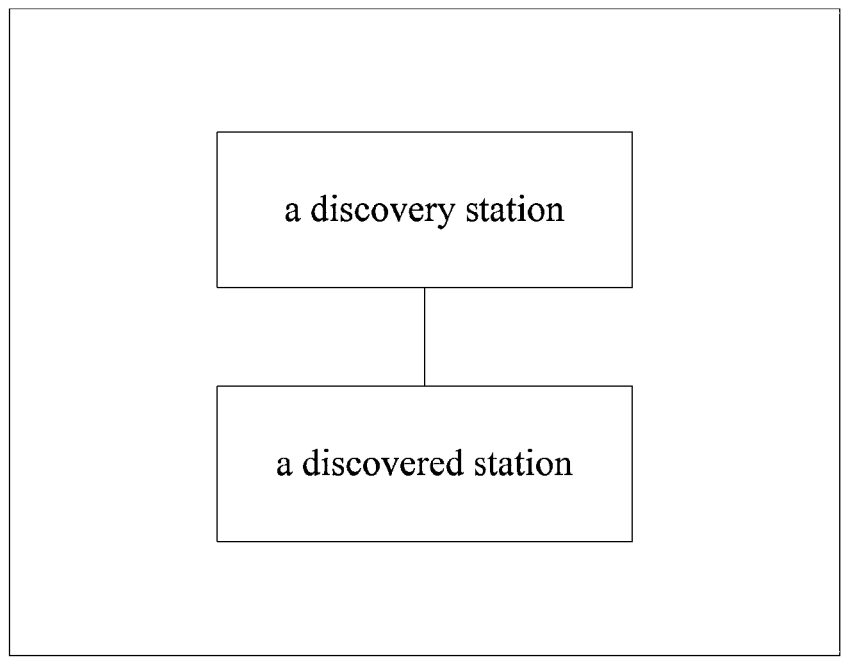
FIG. 8 is a structure diagram of a system for security identity discovery or communication provided by an embodiment of the present invention.

The eighth embodiment of the present invention provides a security identity discovery system. FIG. 8 shows a schematic structure diagram of the station. As shown in FIG. 8, the system includes a first station and a second station.

Wherein, the first station further includes the first sending module, the receiving module, the authenticating module and the second sending module in the fourth embodiment.

The second station further includes the first receiving module, the authenticating module, the first sending module and the second receiving module in the sixth embodiment.

Preferably, the second station in the security identity discovery system further includes the determining module in the sixth embodiment.

Preferably, the second station in the security identity discovery system further includes the recording module in the sixth embodiment.

Preferably, the first station in the security identity discovery system further includes the calculating module in the fifth embodiment, and the second station further includes the calculating module in the eighth embodiment.

Preferably, the first station in the security identity discovery system further includes the encrypting module in the fifth embodiment, and the second station further includes the encrypting module in the eighth embodiment.

Embodiment 9

The ninth embodiment of the present invention provides a security identity communication system. FIG. 8 shows a schematic structure diagram of the station. As shown in FIG. 8, the system includes a first station and a second station.

Wherein, the first station further includes the first sending module, the receiving module, the authenticating module and the second sending module in the fourth embodiment, and the third sending module in the fifth embodiment.

The second station further includes the first receiving module, the authenticating module, the first sending module and the second receiving module in the sixth embodiment, and the second sending module in the ninth embodiment.

Preferably, the first station in the security identity discovery system further includes the extracting module in the fifth embodiment.

Preferably, the second station in the security identity discovery system further includes the extracting module in the seventh embodiment.

Preferably, the first station in the security identity discovery system further includes the extracting module in the fifth embodiment, and correspondingly, the second station further includes the extracting module in the seventh embodiment.

Those skilled in the art to which the present invention pertains may clearly understand that, for convenience and simplicity of description, the specific working process of the device and unit described above may refer to the corresponding process in the above-mentioned method embodiment, and will not be repeated redundantly herein.

In the several embodiments provided by the present invention, it should be understood that the disclosed device and method may be implemented in other manners. For example, the device embodiment described above is merely exemplary, e.g., the division of the units is only a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, the components displayed as units may be physical units or not, namely, may be located in one place, or may be distributed on a plurality of network units. A part of or all of the units may be selected to achieve the purpose of the solution of the embodiment according to actual demand.

In addition, the functional units in the embodiments of the present invention may be integrated in a processing unit, or the units singly exist physically, or two or more units are integrated in one unit. The above-mentioned integrated unit may be implemented in the form of hardware and may also be implemented in the form of a software functional unit.

When the integrated unit is implemented in the form of the software functional unit and is sold or used as an independent product, it may be stored in a computer readable storage medium. Based on this understanding, the technical solutions of the present invention substantially, or the part contributing to the prior art, or all or a part of the technical solutions may be implemented in the form of a software product, the computer software product is stored in a storage medium, and includes a plurality of instructions enabling computer equipment (may be a personnel computer, a server, or network equipment, etc.) to execute all or a part of the methods in the embodiments of the present invention. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

The foregoing descriptions are merely preferred implementations of the present invention, for enabling those skilled in the art to understand or implement the present invention. Various modifications to these embodiments will be apparent for those skilled in the art, and general principles defined in this description may be implemented in other embodiments without departing from the spirit or scope of the present invention. Therefore, the present invention will not be limited to these embodiments described in this description, but conforms to the widest range consistent with the principles and novel features disclosed in this application.

What is claimed is:

1. A security identity discovery method, comprising:
   sending, by a first station, an identity discovery frame, wherein the identity discovery frame comprises an identity code of the first station and target station information, and the target station information comprises a first ciphertext;
   receiving, by the first station, an identity authentication frame sent by a second station, wherein the identity authentication frame comprises an identity code of the second station, the identity code of the first station and a second ciphertext;
   authenticating, by the first station, an identity of the second station based on the received identity authentication frame; and
   sending, by the first station, an identity confirmation frame to the second station, wherein the identity confirmation frame comprises the identity code of the second station;
   wherein the first ciphertext is calculated through a first default algorithm based on a medium access control (MAC) address of the first station and a MAC address of a target station to which the identity discovery frame is sent
   wherein the second ciphertext is calculated through a third default algorithm based on a MAC address of the second station and a third MAC address;
   wherein the third MAC address is calculated by the second station through a second default algorithm based on the MAC address of the second station and the first ciphertext;
   wherein the authenticating comprises:
      calculating, by the first station, a fourth MAC address through a fourth default algorithm based on the MAC address of the first station and the second ciphertext, and
      determining whether the fourth MAC address matches the MAC address of the target station to which the identity discovery frame is sent.

2. The method of claim 1, wherein the identity confirmation frame further comprises denial information, and the denial information indicates that the second station does not pass an identity authentication.

3. A security identity discovery method, comprising:
   sending, by a first station, an identity discovery frame, wherein the identity discovery frame comprises an identity code of the first station and target station information, and the target station information comprises a first ciphertext;
   receiving, by the first station, an identity authentication frame sent by a second station, wherein the identity authentication frame comprises an identity code of the second station, the identity code of the first station and a second ciphertext;
   authenticating, by the first station, an identity of the second station based on the received identity authentication frame; and
   sending, by the first station, an identity confirmation frame to the second station, wherein the identity confirmation frame comprises the identity code of the second station;
   wherein the first ciphertext is calculated through a first algorithm based on a medium access control (MAC) address of the first station and a MAC address of a target station to which the identity discovery frame is sent, and wherein the target station information further comprises a first indicating bit, the first indicating bit providing an indication of the first algorithm;
   wherein the second ciphertext is calculated through a third algorithm based on a MAC address of the second station and a third MAC address, and wherein the identity authentication frame further comprises a second indicating bit, the second indicating bit providing an indication of the third algorithm;
   wherein the third MAC address is calculated by the second station through a second algorithm based on the MAC address of the second station and the first ciphertext; and
   wherein the authenticating comprises:
      determining, by the first station, a fourth algorithm based on the second indicating bit,
      calculating a fourth MAC address through the fourth algorithm based on the MAC address of the first station and the second ciphertext, and
      determining whether the fourth MAC address matches the MAC address of the target station to which the identity discovery frame is sent.

4. The method of claim 3, wherein the identity confirmation frame further comprises denial information, and the denial information indicates that the second station does not pass an identity authentication.

5. A security identity discovery method, comprising:
   receiving, by a second station, an identity discovery frame from a first station, wherein the identity discovery frame comprises an identity code of the first station and target station information, the target station information comprising a first ciphertext;
   authenticating, by the second station, an identity of the first station based on the received identity discovery frame;

sending, by the second station, an identity authentication frame to the first station, wherein the identity authentication frame comprises an identity code of the second station, the identity code of the first station and a second ciphertext; and receiving, by the second station, an identity confirmation frame from the first station, wherein the identity confirmation frame comprises the identity code of the second station;

wherein the first ciphertext is calculated through a first default algorithm based on a medium access control (MAC) address of the first station and a MAC address of the target station to which the identity discovery frame is sent;

wherein the authenticating comprises:
    calculating, by the second station, a third MAC address through a second default algorithm based on a MAC address of the second station and the first ciphertext, and
    determining whether the third MAC address matches a friend station of the second station;

wherein sending the identity authentication frame to the first station is in response to determining that the third MAC address matches the friend station of the second station; and wherein the second ciphertext carried by the identity authentication frame is calculated through a third default algorithm based on the MAC address of the second station and the third MAC address.

6. The method of claim 5, wherein the target station information further comprises partial medium access control (MAC) address information of a target station to which the identity discovery frame is sent, and the identity of the first station is authenticated by the second station based on the partial MAC address information matching the MAC address of the second station.

7. The method of claim 5, wherein the identity confirmation frame further comprises denial information, and the denial information indicates that the second station does not pass an identity authentication.

8. The method of claim 7, further comprising:
recording, by the second station, the identity code of the first station in a stranger list; and
discarding any data packet comprising the identity code of the first station for a period of time based on the identity code of the first station being in the stranger list.

9. The method of claim 5, further comprising:
sending, by the second station, a data packet to the first station, wherein the data packet comprises sender address information and receiver address information, wherein the sender address information is the identity code of the second station, and wherein the receiver address information is the identity code of the first station; and
extracting, based on a number of digits of the identity code exceeding a number of digits of a normal medium access control (MAC) address, a shortened identity code from the identity code, and adding the shortened identity code in address information corresponding to the data packet.

10. A security identity discovery method, comprising:
receiving, by a second station, an identity discovery frame from a first station, wherein the identity discovery frame comprises an identity code of the first station and target station information, the target station information comprising a first ciphertext;
authenticating, by the second station, an identity of the first station based on the received identity discovery frame;

sending, by the second station, an identity authentication frame to the first station, wherein the identity authentication frame comprises an identity code of the second station, the identity code of the first station and a second ciphertext; and receiving, by the second station, an identity confirmation frame from the first station, wherein the identity confirmation frame comprises the identity code of the second station;

wherein the first ciphertext is calculated through a first algorithm based on a medium access control (MAC) address of the first station and a MAC address of a target station to which the identity discovery frame is sent, the target station information further comprising a first indicating bit, the first indicating bit providing an indication of the first algorithm;

wherein the authenticating comprises:
    determining, by the second station, a second algorithm based on the first indicating bit,
    calculating a third MAC address through the second algorithm based on a MAC address of the second station and the first ciphertext, and
    determining whether the third MAC address matches a friend station of the second station; and wherein sending the identity authentication frame is in response to determining that the third MAC address matches the friend station of the second station, wherein the identity authentication frame comprises the second ciphertext and a second indicating bit, the second ciphertext is calculated through an third algorithm based on the MAC address of the second station and the third MAC address, and the second indicating bit provides an indication of the third algorithm.

11. The method of claim 10, wherein the target station information further comprises partial medium access control (MAC) address information of a target station to which the identity discovery frame is sent, and the identity of the first station is authenticated by the second station based on the partial MAC address information matching the MAC address of the second station.

12. The method of claim 10, wherein the identity confirmation frame further comprises denial information, and the denial information indicates that the second station does not pass an identity authentication.

13. The method of claim 12, further comprising:
recording, by the second station, the identity code of the first station in a stranger list; and
discarding any data packet comprising the identity code of the first station for a period of time based on the identity code of the first station being in the stranger list.

14. The method of claim 10, further comprising:
sending, by the second station, a data packet to the first station, wherein the data packet comprises sender address information and receiver address information, wherein the sender address information is the identity code of the second station, and wherein the receiver address information is the identity code of the first station; and
extracting, based on a number of digits of the identity code exceeding a number of digits of a normal medium access control (MAC) address, a shortened identity code from the identity code, and adding the shortened identity code in address information corresponding to the data packet.

15. A security identity discovery method, comprising:
receiving, by a second station, an identity discovery frame from a first station, wherein the identity discovery frame comprises an identity code of the first station and target station information, the target station information comprising a first ciphertext;

authenticating, by the second station, an identity of the first station based on the received identity discovery frame;

sending, by the second station, an identity authentication frame to the first station, wherein the identity authentication frame comprises an identity code of the second station, the identity code of the first station and a second ciphertext; and receiving, by the second station, an identity confirmation frame from the first station, wherein the identity confirmation frame comprises the identity code of the second station;

wherein the authenticating comprises:
  determining, by the second station, whether the first ciphertext is the same as a shared ciphertext, wherein the shared ciphertext is a ciphertext shared by the second station and a friend station of the second station;

wherein the target station information further comprises partial medium access control (MAC) address information of a target station to which the identity discovery frame is sent, and the identity of the first station is authenticated by the second station based on the partial MAC address information matching the MAC address of the second station; and wherein the target station information further comprises a selection strategy indicating bit, the selection strategy indicating bit indicates an algorithm for selecting the partial MAC address information in the MAC address of the target station, the second station determines a selection algorithm of the partial MAC address information based on the selection strategy indicating bit, and the second station authenticates the identity of the first station based on the partial MAC address information matching the MAC address of the second station.

16. The method of claim 15, wherein the identity confirmation frame further comprises denial information, and the denial information indicates that the second station does not pass an identity authentication.

17. The method of claim 16, further comprising:
  recording, by the second station, the identity code of the first station in a stranger list; and
  discarding any data packet comprising the identity code of the first station for a period of time based on the identity code of the first station being in the stranger list.

18. A security identity first station, comprising a processor and a non-transitory processor-readable medium, the non-transitory processor-readable medium having processor-executable instructions stored thereon, the processor-executable instructions including a plurality of modules, the modules including:
  a first sending module, configured to send an identity discovery frame, wherein the identity discovery frame comprises an identity code of the first station and target station information, and the target station information comprises a first ciphertext;
  a receiving module, configured to receive an identity authentication frame from a second station, wherein the identity authentication frame comprises an identity code of the second station, the identity code of the first station and a second ciphertext;
  an authenticating module, configured to authenticate an identity of the second station; and
  a second sending module, configured to send an identity confirmation frame to the second station, wherein the identity confirmation frame comprises the identity code of the second station;

wherein the modules further comprise:
  a calculating module, configured to calculate the first ciphertext through a first default algorithm based on a medium access control (MAC) address of the first station and a MAC address of a target station to which the identity discovery frame is sent;

wherein the calculating module is further configured to calculate a fourth MAC address through a fourth default algorithm based on the MAC address of the first station and the second ciphertext, wherein the second ciphertext is based on a third default algorithm, a MAC address of the second station and a third MAC address, and wherein the third MAC address is based on a second default algorithm, the MAC address of the second station and the first ciphertext; and wherein the authenticating module is configured to determine whether the fourth MAC address matches the target station to which the identity discovery frame is sent.

19. The first station of claim 18, wherein the modules further comprise:
  a third sending module, configured to send a data packet to the second station, wherein the data packet comprises sender address information and receiver address information, wherein the sender address information is the identity code of the first station, and the receiver address information is the identity code of the second station.

20. A security identity first station, comprising a processor and a non-transitory processor-readable medium, the non-transitory processor-readable medium having processor-executable instructions stored thereon, the processor-executable instructions including a plurality of modules, the modules including:
  a first sending module, configured to send an identity discovery frame, wherein the identity discovery frame comprises an identity code of the first station and target station information, and the target station information comprises a first ciphertext;
  a receiving module, configured to receive an identity authentication frame from a second station, wherein the identity authentication frame comprises an identity code of the second station, the identity code of the first station and a second ciphertext;
  an authenticating module, configured to authenticate an identity of the second station; and
  a second sending module, configured to send an identity confirmation frame to the second station, wherein the identity confirmation frame comprises the identity code of the second station;

wherein the modules further comprise:
  an encrypting module, configured to calculate the first ciphertext through a first algorithm based on a medium access control (MAC) address of the first station and a MAC address of the target station to which the identity discovery frame is sent;

wherein the encrypting module is further configured to determine a fourth algorithm based on a second indicating bit of the identity authentication frame, and to calculate a fourth MAC address through the fourth algorithm based on the MAC address of the first station and the second ciphertext, wherein the second ciphertext is based on a third algorithm, a MAC adddress of the second station and a third MAC address, and wherein the third MAC address is based on a second algorithm, the MAC address of the second station and the first ciphertext; and wherein the authenticating module is configured to determine whether the fourth MAC address matches the target station to which the identity discovery frame is sent.

\* \* \* \* \*